(12) United States Patent
Gupta et al.

(10) Patent No.: US 12,137,268 B2
(45) Date of Patent: Nov. 5, 2024

(54) SYSTEMS AND METHODS FOR GENERATING A PLAYBACK TIMELINE

(71) Applicant: Adeia Guides, Inc., San Jose, CA (US)

(72) Inventors: Vikram Makam Gupta, Karnataka (IN); Vishwas Sharadanagar Panchaksharaiah, Tumkur District (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/084,656

(22) Filed: Dec. 20, 2022

(65) Prior Publication Data
US 2023/0156273 A1 May 18, 2023

Related U.S. Application Data

(63) Continuation of application No. 17/480,392, filed on Sep. 21, 2021, now Pat. No. 11,564,004, which is a continuation of application No. 16/424,237, filed on May 28, 2019, now Pat. No. 11,153,642.

(51) Int. Cl.
| | | |
|---|---|---|
| H04N 21/4402 | (2011.01) | |
| H04N 21/45 | (2011.01) | |
| H04N 21/472 | (2011.01) | |
| H04N 21/845 | (2011.01) | |

(52) U.S. Cl.
CPC ... H04N 21/44029 (2013.01); H04N 21/4532 (2013.01); H04N 21/47202 (2013.01); H04N 21/8455 (2013.01)

(58) Field of Classification Search
CPC ....... H04N 21/44029; H04N 21/47202; H04N 21/8455; H04N 21/4532
See application file for complete search history.

(56) References Cited

U.S. PATENT DOCUMENTS

| | | |
|---|---|---|
| 9,244,678 B1 | 1/2016 | Hatch et al. |
| 9,705,942 B2 | 7/2017 | Ghaskadvi |
| 10,063,927 B1 | 8/2018 | Singh et al. |
| 10,536,542 B1 | 1/2020 | Dorner et al. |
| 2004/0034865 A1 | 2/2004 | Barrett et al. |
| 2007/0154169 A1 | 7/2007 | Cordray et al. |

(Continued)

FOREIGN PATENT DOCUMENTS

| | | |
|---|---|---|
| WO | 2018097835 A1 | 5/2018 |
| WO | 2018160188 A1 | 9/2018 |
| WO | 2019050853 A1 | 3/2019 |

*Primary Examiner* — Sumaiya A Chowdhury
(74) *Attorney, Agent, or Firm* — HALEY GUILIANO LLP

(57) ABSTRACT

The system generates a display providing condensing content for display under time constraints. In response to a selection of a program that has already started, the system retrieves information about the program. Based on this information, and information about the user, the system selects a subset of segments of the program, forming a shorter version of the content that fits within a reduced time interval, from the time of selection to a scheduled end time. Accordingly, the user is presented with the condensed version of the currently selected program by, including the important or relevant segments of the program. The system generates the condensed content by selecting segments of the program that are determined to be important to the user and that cumulatively fit with the available viewing time. The system may sort, score, or otherwise rank segment identifiers based on user profile information.

16 Claims, 9 Drawing Sheets

(56) References Cited

U.S. PATENT DOCUMENTS

| | | |
|---|---|---|
| 2008/0253735 A1 | 10/2008 | Kuspa et al. |
| 2009/0077590 A1* | 3/2009 | Nielen ................ H04N 21/482 |
| | | 725/47 |
| 2010/0142915 A1 | 6/2010 | McDermott et al. |
| 2010/0153984 A1 | 6/2010 | Neufeld |
| 2013/0042262 A1 | 2/2013 | Riethmueller |
| 2016/0073168 A1 | 3/2016 | Gardes et al. |
| 2016/0105708 A1* | 4/2016 | Packard ........... H04N 21/23418 |
| | | 725/10 |
| 2017/0171631 A1 | 6/2017 | Peterson |
| 2020/0382834 A1 | 12/2020 | Gupta et al. |
| 2020/0382841 A1 | 12/2020 | Gupta et al. |
| 2022/0007073 A1 | 1/2022 | Gupta et al. |

* cited by examiner

SYSTEMS AND METHODS FOR GENERATING A PLAYBACK TIMELINE

CROSS-REFERENCE TO RELATED APPLICATION

This application is a continuation of U.S. patent application Ser. No. 17/480,392, filed Sep. 21, 2021, which is a continuation of U.S. patent application Ser. No. 16/424,237, filed May 28, 20219, now U.S. Pat. No. 11,153,642, the disclosures of which are hereby incorporated by reference herein their entireties.

BACKGROUND

The present disclosure relates to devices displaying content having segments, and, more particularly, devices that display content based on adjusted timelines.

SUMMARY

Content, such as episodic programming, is becoming more complex and consumers are increasingly interested in viewing content in a personalized way on their own schedule. For example, a typical show might be scheduled to be displayed during a predetermined time period. A viewer selecting a program part way through the scheduled display time may miss some of the important scenes. Because programs may include a series of chapters or segments, they may be discretized. Similarly, some of the segments may be more relevant or important for the user.

The present disclosure describes systems and methods for condensing content for display under time constraints. In some embodiments, in response to a selection of a program that has already started, the system retrieves information about the program. Based on this information, and information about the user, the system selects a subset of segments of the program, forming a shorter version of the content that fits within a reduced time interval, from the time of selection to a scheduled end time. In some embodiments, the system retrieves information about many program, and generates markers. The markers indicate at which time a particular condensed version can still be viewed, ending at a predetermined end time. Based on program information and user information, the system selects a subset of segments of the program, corresponding to a shorter version of the content that fits within each reduced time interval, from the time of marker to a scheduled end time. Accordingly, the user is presented with indicators of when to begin viewing a program by to be able to view important or relevant segments of the program.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
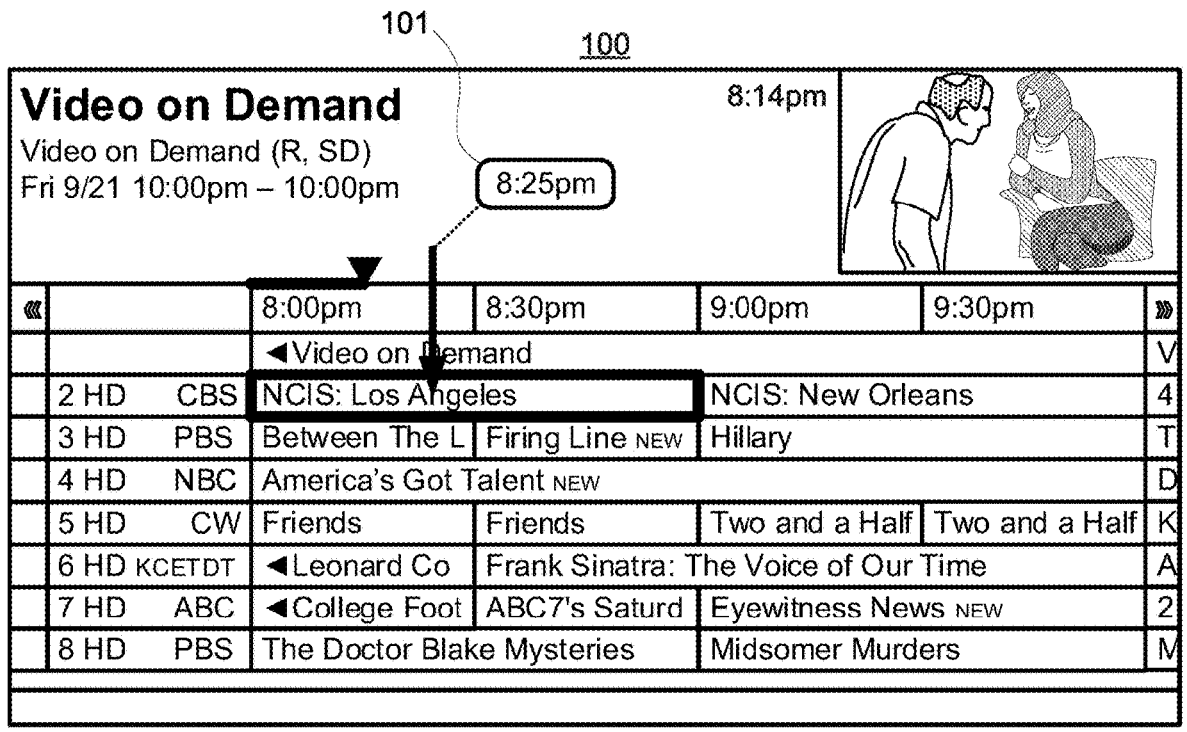
FIG. 1 shows two displays of an illustrative guidance application having a selected program, in accordance with some embodiments of the present disclosure.
Figure 1:
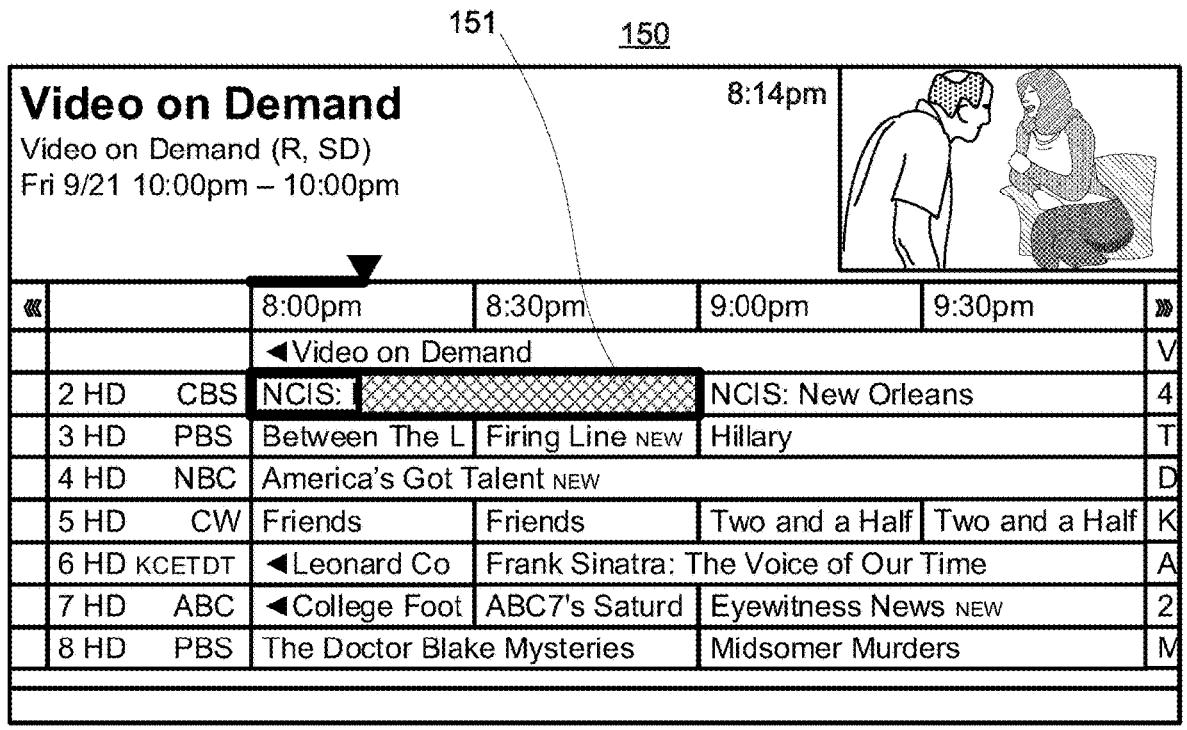

FIG. 1 shows displays 100 and 150 of an illustrative guidance application having a selected program, in accordance with some embodiments of the present disclosure. A cursor or other highlight may be used to select content items for viewing by a user. For example, upon receiving a selection of a program based on the cursor, the guidance application may retrieve data and metadata for the program. The guidance application may determine a set of segments to present to a user based on importance of the segment and based on time constraints. The guidance application may be implemented with control circuitry of any suitable device or combination of devices, in accordance with the present disclosure.

Display 100, as illustrated includes a grid of program identifiers with the vertical axis defined by channel and the horizontal axis defined by predetermined display time. For example, time slots ranging from 8:00 pm to 10:00 pm are illustrated for seven channels. The current clock time as illustrated in display 100 is 8:14 pm, with the cursor highlighting NCIS: Los Angeles. In some embodiments, referencing display 100, in response to the selection of NCIS: Los Angeles at 8:14 pm, the guide generates marker 101 at 8:25 pm, which in this illustrative example, is the time at which the user can start this program before and still be able to watch all necessary segments of the program by 9:00 pm. For example, the guide determines that thirty-five minutes is required to display the necessary segments. In some embodiments, the guidance application generates a marker, before which the user can view a condensed version of the program at a regular end-time while not miss any segments of actual program that are deemed important. The guidance application may display the marker, or otherwise alert the user that a condensed version of the program exists.

Display 150, as illustrated includes a grid of program identifiers with the vertical axis defined by channel and the horizontal axis defined by predetermined display time, similar to display 100. The current clock time as illustrated in display 150 is 8:14 pm, when the cursor is highlighting NCIS: Los Angeles. In some embodiments, when NCIS: Los Angeles is selected by a user, and is scheduled to be displayed from 8:00 pm-9:00 pm, the system determines whether to, and how to, generate condensed content, indicated by time interval 151 (e.g., extending from 8:14 pm-9:00 pm). For example, in some embodiments, the guidance application extracts detailed metadata of the program (e.g., NCIS: Los Angeles as illustrated) as well as user profile information when the program is selected. The detailed metadata may indicate time indicators for each segment of the program along with recap time, introduction time, advertisement time, post credits time, any other times, or any combination thereof. The guidance application may determine which segments of the program to display to fit within the time constraints. For example, in the illustrated example, the clock time is 8:14 pm and the end time is 9:00 pm, thus leaving forty-six minutes for the user to view a condensed version of the episode of NCIS: Los Angeles. The guidance application determines which segments to include based on 1) whether each is important or otherwise relevant to the user, and 2) whether the selected segments cumulatively fit within the forty-six minute interval available for viewing. The guidance application displays the selected segments, along with any other auxiliary content (e.g., advertisements, credits, post-credit content, or other content) within the available interval.

Figure 2:
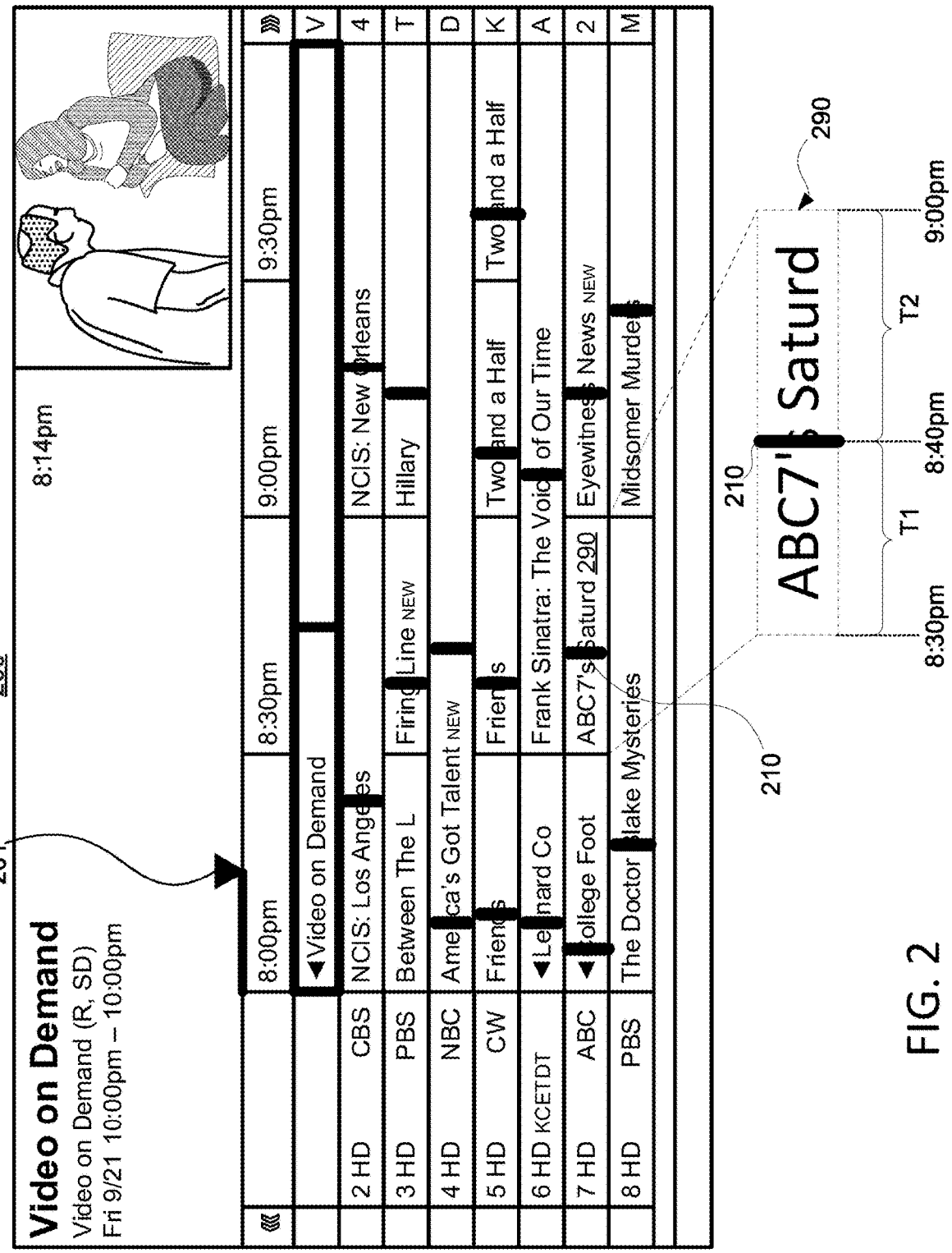
FIG. 2 shows an illustrative guidance application having time markers for a plurality of programs, in accordance with some embodiments of the present disclosure.

FIG. 2 shows an illustrative guidance application having time markers (e.g., marker 210) for a plurality of programs, in accordance with some embodiments of the present disclosure. Display 200, as illustrated includes a grid of program identifiers with the vertical axis defined by channel and the horizontal axis defined by predetermined display time, similar to displays 100 and 150 of FIG. 1.

In some embodiments, the guidance application generates a plurality of markers 210 for a plurality of programs with associated program identifiers displayed in a grid (e.g., of display 200). The generation of markers (e.g., marker 210) may occur at any suitable time, not necessarily in response to a user input or selection of a program. For example, the guidance application may display a grid of program identifiers, predetermined markers (e.g., marker 210), and any other suitable information in the form of a program guide. In some embodiments, the guidance application may include more than one marker per program or episode, indicating different extents of condensed content. For example, for a program scheduled to be displayed from 8:00 pm-9:00 pm, the guidance application may determine condensed content that is forty minutes long, and then further condensed content that is 25 minutes long and generate markers at 8:20 pm and 8:35 pm, respectively.

As illustrated, program identifier 290 is shown enlarged in FIG. 2. The marker of markers 210 that corresponds to program identifier 290 is positioned such that the normally scheduled display time is divided into durations T1 (e.g., before marker 210) and T2 (e.g., after marker 210), wherein the sum of T1 and T2 corresponds to the original program playback duration. If the user selects the program before marker 210 at 8:35 pm, then there is sufficient time for the user to view the important content of the program, which has a duration of T2 (e.g., twenty minutes in this example). For example, the guidance application may generate the condensed version, having duration T2, starting at 8:35 pm when the user selects the program (e.g., and finishing early before 9 pm at 8:55 pm). In a further example, if the user selects the program before the marker the guidance application may add a portion of a segment to the condensed content to achieve a cumulative playback time equal to the available playback time (e.g., if a user selects the program at 8:35 pm, then the condensed content is twenty-five minutes long).

As illustrated in FIGS. 1-2, a guidance application may predetermine one or more markers based on condensing content for time constraints, generate condensed content in response to a user selection, or both. Generation of condensed content for time-constrained viewing allows the user to enjoy the important aspects of a program without having to figure out when to fast forward, for example. The generation, and optional display of, markers allows the guidance application to discretize the viewing time interval to capture important segments of the program as needed to fit within the available time. The generation of condensed content and markers are described further in the context of FIGS. 6-8.

Figure 3:
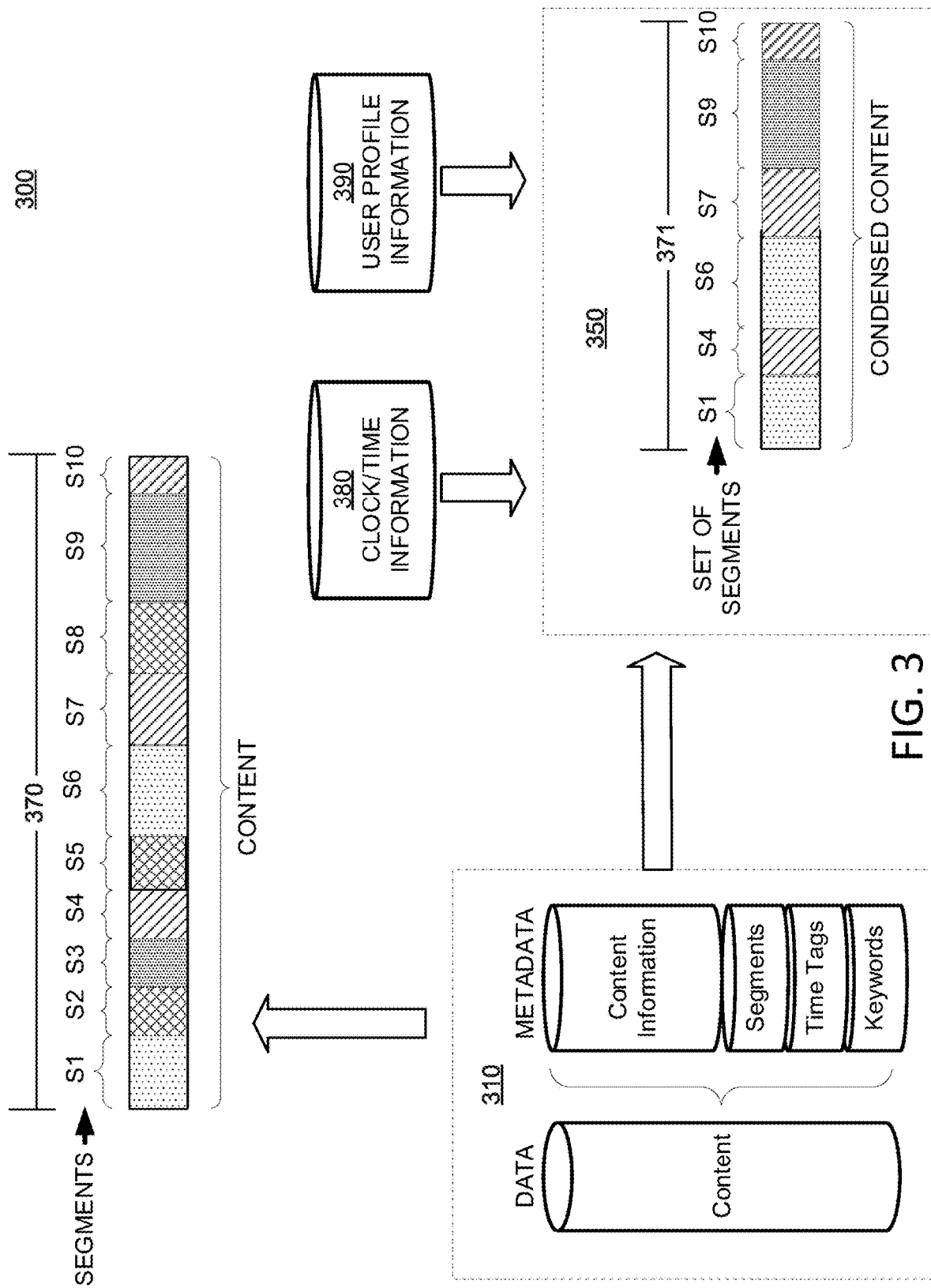
FIG. 3 shows a block diagram of an illustrative arrangement of data and metadata for generating condensed content, in accordance with some embodiments of the present disclosure.

FIG. 3 shows a block diagram of illustrative arrangement 300 of data and metadata for generating condensed content, in accordance with some embodiments of the present disclosure. As illustratively shown in FIG. 3, media content and corresponding metadata (e.g., collectively referred to as information 310) may be organized by segment, from which a timeline or playback order may be generated (e.g., timeline 370).

Information 310 includes video or audio data of the content (e.g., a linear program), as well as metadata associated with the content such as segments, time tags, keyword tags, any other suitable information, or any combination thereof. In some embodiments, chapter numbers, chapter titles, character names, actor names, location names, storylines, plots, start times, end times, time durations, keywords, key phrases, and any other suitable information may be included in metadata of information 310. To illustrate, a plurality of segment identifiers of the content may each be defined, each having a corresponding start time and end time and other suitable corresponding information. For example, the second segment "S2" may be titled "The Season" and have a start time of "00:24:15," an end time of "00:38:10," and character tags "Oliver" and "Ms. Smith." Metadata may be stored and indexed using any suitable technique, file type, database type, field type, data structure, class structure, and format, having any suitable amount of data corresponding to the content. Information 310 may be available for a plurality of episodes (e.g., episodes of one or more seasons, games of one or more tournaments, etc.) of a program. For example, an instance of information 310 may be stored for each episode of a program. Data may include audio data, video data, or both, in any suitable format. For example, data may be formatted as an MP4 file, a WMV file, an AVI file, a WAV file, any other suitable encoding format, or any combination thereof. The system may include any suitable audio or video codec configured to compress, decompress, or both, the data files.

Based on metadata of information 310, for each segment, importance information may be stored (e.g., in memory), extracted (e.g., by a software application executing instructions on stored information), retrieved (e.g., from memory), determined (e.g., based on user profile information 390), or otherwise processed. The generation of scores and metrics is described further in the context of FIG. 7, for example. Importance information may include a segment identifier (e.g., such as segment four "S4"), play times of each segment (e.g., durations), any other suitable information, or any combination thereof. For example, as illustrated, the program includes ten segments, S1-S10, which are arranged accordingly to playback timeline 370. Playback timeline 370 includes the sequence order of the segments, the playback time (e.g., per segment and/or cumulative), or a combination thereof. Each segment has an associated time indicator (e.g., stored in "Time Tags" of metadata of information 310) that includes, for example, a start time, an end time, a duration, or a combination thereof.

Timeline 370 illustrates a chronological arrangement of the data of information 310 (e.g., a playback order) for a plurality of segments of a program. As illustrated, ten segments are shown (e.g., S1-S10). Each segment may be defined by one or more time indicators stored in metadata of information 310. For example, a time indicator may include a start time, an end time, a duration, a sequence index, or any other indicator of time or sequence corresponding to a segment of a plurality of segments of content. The time durations for each segment may be, but need not be, the same. For example, in some circumstances, content is partitioned into segments having the same duration (e.g., a one-hour episode includes four segments of fifteen minutes each). In a further example, in some circumstances, content is partitioned into segments that have differing lengths (e.g., the segments sum to one hour, but do not have the same durations).

In an illustrative example, referencing FIG. 3, content information (e.g., listing of episodes and/or seasons, metadata, storylines) of the entire series may be overwhelming or otherwise include more information than desired by a user viewing a display. User profile information 390, stored in suitable memory of one or more devices, may include preferred storylines, characters, other attributes, keywords, any other suitable user preferences, user viewing history, user content-purchase history, any other suitable information associated with a user, or any combination thereof.

Clock/time information 380 includes information such as, for example, a current clock time, a clock time associated with a user input or selection, a display time of a program (e.g., start time, end time, or duration), program schedules, any other temporal information, or any combination thereof. Clock/time information 380 is stored in any suitable memory on any suitable device or combination of devices. In some embodiments, for example, clock/time information 380 is determined by control circuitry. The time may be based on an oscillator circuit (e.g., a "real time clock" or RTC), a time communicated from a network entity (e.g., to calibrate a software clock), a clock implemented in hardware and/or software, any other suitable time reference, or any combination thereof.

The guidance application generates condensed content 350, arranged accordingly to playback timeline 371 based on the original content (e.g., arranged accordingly to playback timeline 370), time constraints (e.g., current time until an end time), time information (e.g., from clock/time information 380), and user information (e.g., from user profile information 390). For example, as illustrated, condensed content 350 includes segments S1, S4, S6, S7, S9, and S10 arranged along playback timeline 371, which is condensed relative to playback timeline 370. To further illustrate, the guidance application has determined segments S1, S4, S6, S7, S9, and S10 cumulatively fit within an available playback time, and include the important scenes a user may be interested in.

In an illustrative example, the guidance application generates a display of program identifiers and a user-selectable cursor. In response to the user selecting a particular program at a particular clock time, the guidance application retrieves information 310, or portions thereof, including content, metadata, or both. The guidance application also retrieves the current time from clock/time information 380, and retrieves the user's profile information from user profile information 390. The guidance application determines how much time is available for viewing (e.g., the normal program end time minus the current time), and based on the available time and the profile information, the guidance application selects a subset of segments of the program for display. The guidance application then generates for display condensed content 350 including the subset of segments.

In a further example, the guidance application generates a display of program identifiers and one or more markers associated with one or more program identifiers. The guidance application retrieves one or more users' profile information from user profile information 390. The guidance application selects a subset of segments for each program associated with the one or more program identifiers, determines the cumulative duration of the subsets of segments, and then generates the one or more markers based on the cumulative durations. In some embodiments, the markers are arranged at times based on the cumulative duration of the subset of segments along with any auxiliary content that is suitable or required for display. The guidance application may also generate for display condensed content 350 when a program identifier is selected by a user at a particular time (e.g., wherein the condensed content has a duration suitable for the available viewing time between the particular time and the end time).

Figure 4:
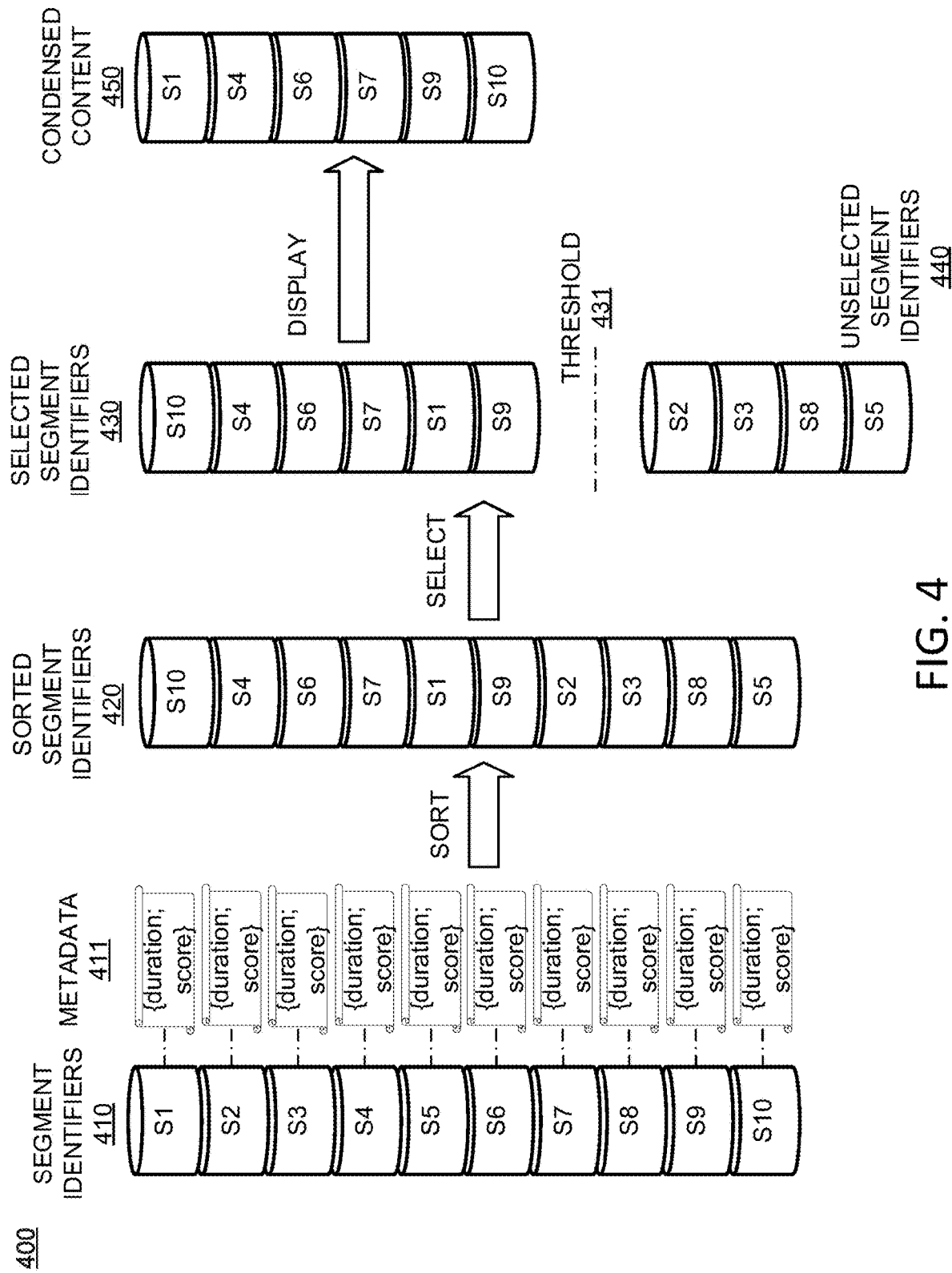
FIG. 4 shows a block diagram of an illustrative process flow for generating condensed content based on metadata, in accordance with some embodiments of the present disclosure.

FIG. 4 shows a block diagram of illustrative process flow 400 for generating condensed content 450 based on metadata 411, in accordance with some embodiments of the present disclosure. Content 410 may be a program, for example, including segments S1, S2, S3, S4, S5, S6, S7, S8, S9, and S10. Each segment has a corresponding duration stored in, or derived from, metadata 411. Each segment also has a corresponding score stored in, or derived from, metadata 411. When the system receives an indication to generate condensed content, the system may then determine which segments to keep or omit to adjust the playback time of the content. In some embodiments, the indication arises from user input. For example, a user may select a program for viewing at a real time $T_1$, and the system may then proceed to generate condensed content 450 to fit within a time interval from $T_1$ to an end time. The end time may correspond to a normal playback end time (e.g., as illustrated in a program guide partitioned by real time), an event time (e.g., a user-specified end time), any other suitable end time, or any combination thereof.

In some embodiments, the system sorts the segment identifiers of segments of content 410 to generate sorted segment identifiers 420, which are arranged by the respective score in ascending order, as illustrated (e.g., but may alternatively be ordered in descending order). In some embodiments, the system need not sort the segment identifiers, and may assign a sequencing index to each segment or segment identifier specifying an ordering. For example, the system may rank the segments without reordering or sorting the segment identifiers. The system selects set of segment identifiers 430 to include in condensed content 450, and does not select set of segment identifiers 440 for inclusion. In some embodiments, as illustrated, the system applies threshold 431 to determine a cutoff for selected and unselected segment identifiers of sorted segment identifiers 420. To illustrate, the system selects segment identifiers associated with segments S1, S4, S6, S7, S9, and S10, and does not select segment identifiers associated with segments S2, S3, S5, and S8.

Figure 5:
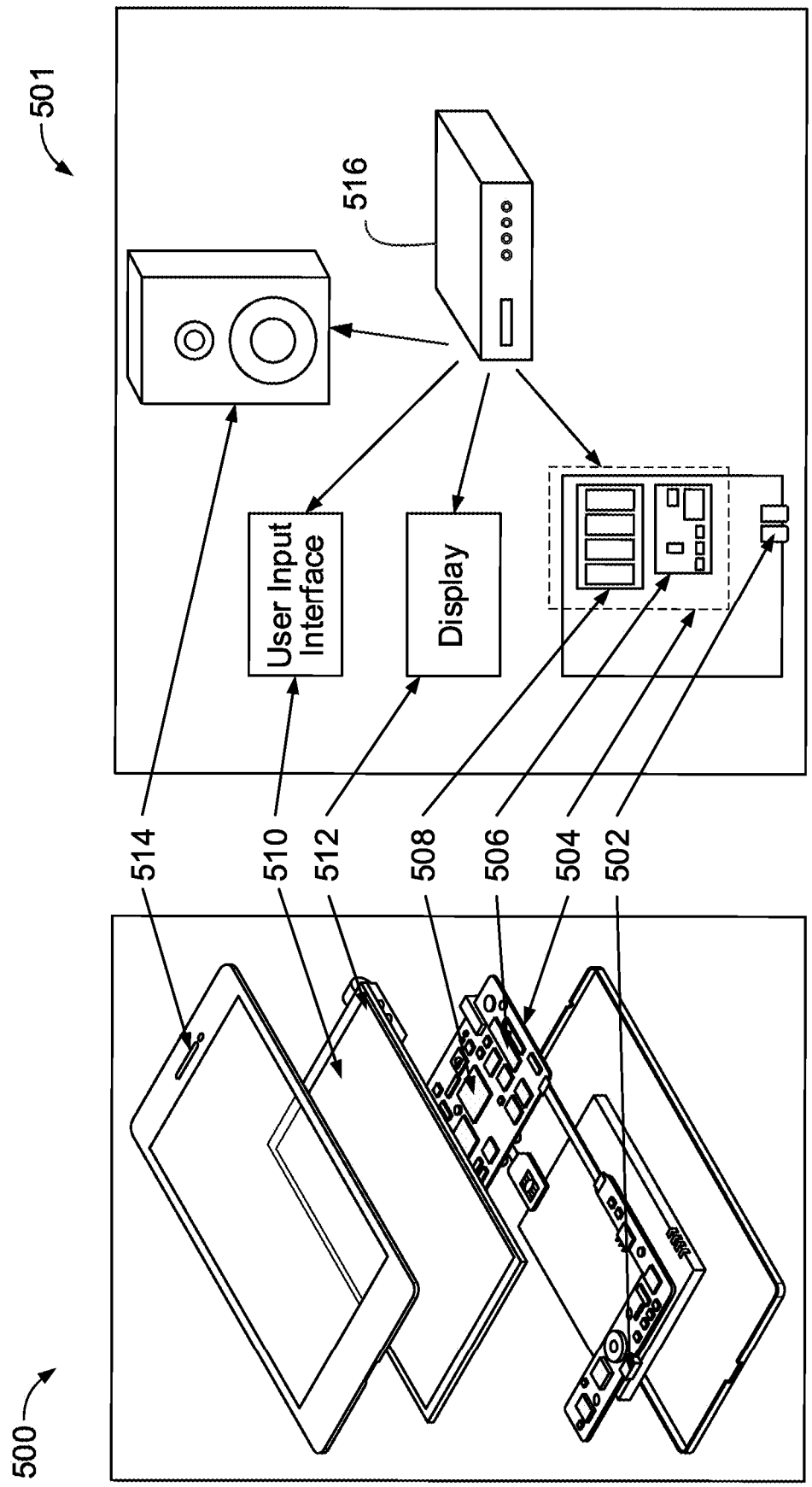
FIG. 5 is a block diagram of an illustrative user equipment, in accordance with some embodiments of the present disclosure.

A user may access content, an application, and other features from one or more of their devices (i.e., user equipment), one or more network-connected devices, one or more electronic devices having a display, or a combination thereof, for example. Any of the illustrative techniques of the present disclosure may be implemented by a user device, a device providing a display to a user, or any other suitable control circuitry configured to generate a display to a user of segmented content. FIG. 5 shows generalized embodiments of an illustrative user device. User equipment system 501 may include set-top box 516 that includes, or is communicatively coupled to, display 512, audio equipment 514, and user input interface 510. In some embodiments, display 512 may include a television display or a computer display. In some embodiments, user interface input 510 is a remote-control device. Set-top box 516 may include one or more circuit boards. In some embodiments, the one or more circuit boards include processing circuitry, control circuitry, and storage (e.g., RAM, ROM, Hard Disk, Removable Disk, etc.). In some embodiments, circuit boards include an input/output path. Each one of user equipment device 500 and user equipment system 501 may receive content and data via input/output (hereinafter "I/O") path 502. I/O path 502 may provide content and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths but are shown as a single path in FIG. 5 to avoid overcomplicating the drawing. While set-top box 516 is shown in FIG. 5 for illustration, any suitable computing device having processing circuitry, control circuitry, and storage may be used in accordance with the present disclosure. For example, set-top box 516 may be replaced by, or complemented by, a personal computer (e.g., a notebook, a laptop, a desktop), a network-based server hosting a user-accessible client device, a non-user-owned device, any other suitable device, or any combination thereof. A guidance application may be implanted on user device 500, user equipment system 501, any other suitable system, or any combination thereof.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for an application stored in memory (e.g., storage 508). Specifically, control circuitry 504 may be instructed by the application to perform the functions discussed above and below. For example, the application may provide instructions to control circuitry 504 to generate the media guidance displays. In some implementations, any action performed by control circuitry 504 may be based on instructions received from the application.

In some client-server-based embodiments, control circuitry 504 includes communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device such as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, for example, may be used to supplement storage 508 or instead of storage 508.

A user may send instructions to control circuitry 504 using user input interface 510. User input interface 510, display 512, or both, may include a touchscreen configured to provide a display and receive haptic input. For example, the touchscreen may be configured to receive haptic input from a finger, a stylus, or both. In some embodiments, equipment device 500 may include a front-facing screen and a rear-facing screen, multiple front screens, or multiple angled screens. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 516.

Audio equipment 514 may be provided as integrated with other elements of each one of user device 500 and user equipment system 501 or may be stand-alone units. The audio component of videos and other content displayed on display 512 may be played through speakers of audio equipment 514. In some embodiments, the audio may be distributed to a receiver (not shown), which processes and outputs the audio via speakers of audio equipment 514. In some embodiments, for example, control circuitry 504 is configured to provide audio cues to a user, or other audio feedback to a user, using speakers of audio equipment 514. Audio equipment 514 may include a microphone configured to receive audio input such as voice commands or speech. For example, a user may speak letters or words that are received by the microphone and converted to text by control circuitry 504. In a further example, a user may voice commands that are received by the microphone and recognized by control circuitry 504.

An application (e.g., for generating a display) may be implemented using any suitable architecture. For example, a stand-alone application may be wholly implemented on each one of user device 500 and user equipment system 501. In some such embodiments, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor cache, Random Access Memory (RAM), etc.

In some embodiments, the application is a client-server-based application. Data for use by a thick or thin client implemented on each one of user device 500 and user equipment system 501 is retrieved on-demand by issuing requests to a server remote from each one of user equipment device 500 and user equipment system 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on user device 500. This way, the processing of the instructions is performed remotely by the server while the resulting displays (e.g., that may include text, a keyboard, or other visuals) are provided locally on user device 500. User device 500 may receive inputs from the user via input interface 510 and transmit those inputs to the remote server for processing and generating the corresponding displays. For example, user device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to user device 500 for presentation to the user.

In some embodiments, the application is downloaded and interpreted or otherwise run by an interpreter or virtual machine (e.g., run by control circuitry 504). In some embodiments, the application may be encoded in the ETV Binary Interchange Format (EBIF), received by control circuitry 504 as part of a suitable feed, and interpreted by a user agent running on control circuitry 504. For example, the application may be an EBIF application. In some embodiments, the application may be defined by a series of JAVA-based files that are received and run by a local virtual machine or other suitable middleware executed by control circuitry 504.

In some embodiments, a system may include a user interface, with processing occurring remotely (e.g., at a network entity). In some embodiments, an application (e.g., a guidance application) for displaying condensed content may be implemented on one or more devices that do not include user devices. In some embodiments, control circuitry is configured to access content, identify segments, and generate for display an informational presentation arranged in suitable way. In some embodiments, application may pre-determine segments of condensed content based on timing constraints. For example, the application may generate a table for each program of start time ranges, and for each start time range, store a corresponding set of segments that can be viewed in a remaining time interval (e.g., the normal end time of the program as presented on a media guide).

Figure 6:
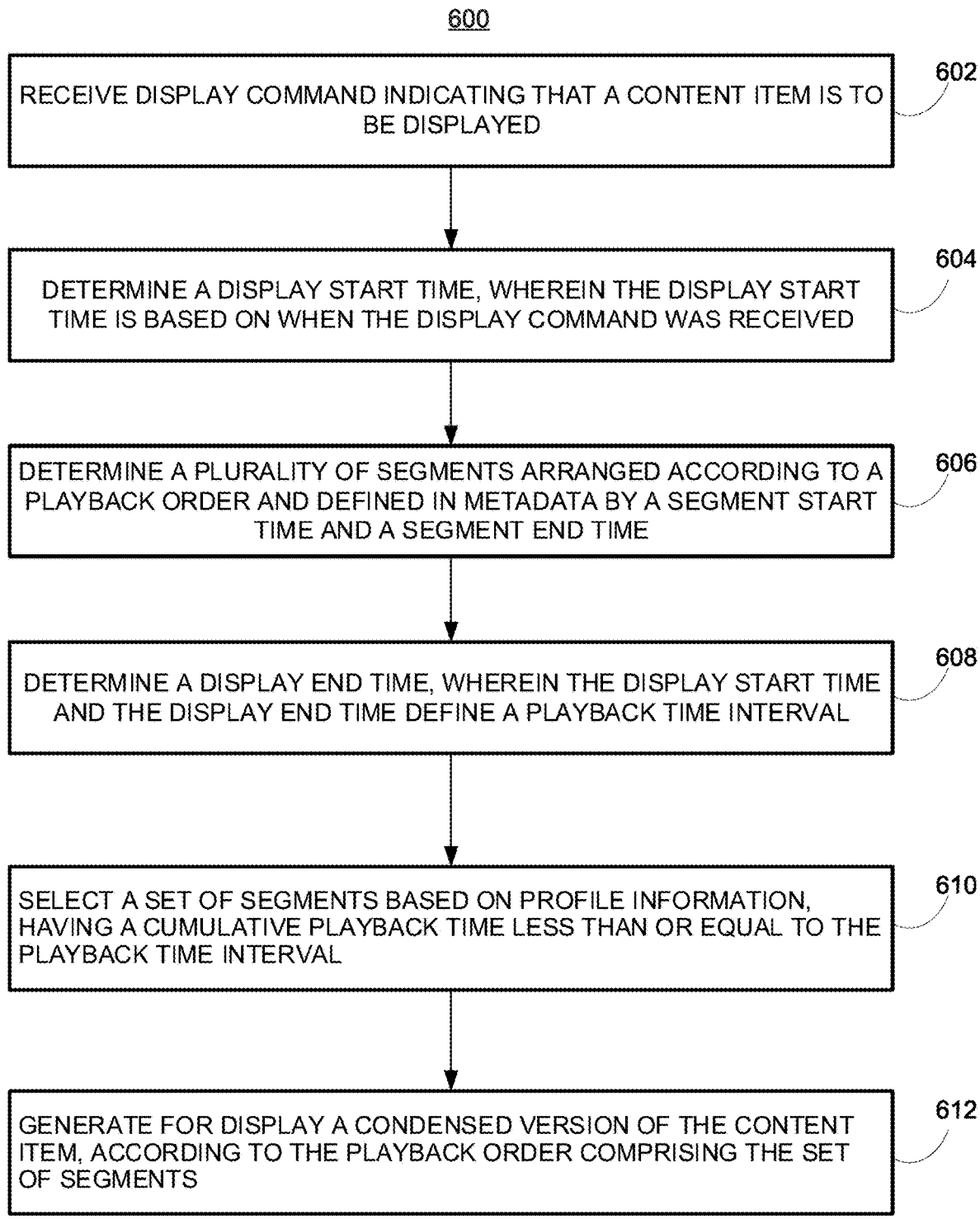
FIG. 6 is a flowchart of an illustrative process for generating condensed content, in accordance with some embodiments of the present disclosure.

FIG. 6 is a flowchart of illustrative process 600 for generating condensed content, in accordance with some embodiments of the present disclosure. The illustrative steps of process 600 may be performed by a guidance application implemented on, for example, user device 500 of FIG. 5, user equipment system 501 of FIG. 5, a network entity (e.g., a server) communicatively coupled to user device 500, user equipment system 501, or a display device, any other suitable computing device, or any combination thereof.

Step 602 includes a guidance application receiving a display command indicating that a content item is to be displayed. In some embodiments, the guidance application identifies the content item based on which program is currently highlighted by a displayed cursor of a guidance application. In some embodiments, the guidance application identifies the content item based on user input. In some embodiments, the guidance application identifies the content item based on which content item is currently being displayed, was previously displayed, is scheduled for display currently, or is otherwise highlighted relative to other content items. In some embodiments, the guidance application identifies the content item as one content item of a plurality of content items, and process 600 is performed for each content item. In some embodiments, the guidance application is configured to receive user input to a user interface (e.g., user input interface 510). The user input may include, for example, haptic input to a touchscreen, depression of buttons of a keypad, voice input to an audio interface (e.g., audio equipment 514), any other input by a user to the system, or any combination thereof. For example, a user may use directional keys on a keypad of a remote-control device configured to communicate with equipment device 500. In a further example, a user may provide a haptic selection on a touchscreen of user device 500. In some embodiments, the system is configured to wait for user input, or otherwise not proceed from step 602 until user input is received.

In some embodiments, the guidance application generates a grid-based display having a timeline (e.g., a time axis) and a grouping (e.g., a channel axis). In some embodiments, the display includes a display of segment identifiers for a program, arranged horizontally by episode and season index into rows, with each row corresponding to a channel In some embodiments, the display includes content information such as, for example, segment identifiers (e.g., episode identifiers, chapter identifiers, segment descriptions, segment plot, segment title, segment characters, segment length or duration, episode year), which segments are currently scheduled for display (e.g., part of condensed content), program information (e.g., information about the program as a whole such as producer, year, rating), time indicators (e.g., real time interval, end time, start time, condensed content duration, or other suitable temporal indicator), storyline information (e.g., storyline identifier, storyline description, storyline), any other suitable information, or any combination thereof.

Step 604 includes the guidance application determining a display start time, wherein the display start time is based on when the display command was received. In some embodiments, the guidance application determines the display start time base on a real time clock implemented in hardware of control circuitry (e.g., an oscillator circuit and battery). In some embodiments, the guidance application accesses a clock-based application to retrieve the current time. In some embodiments, the guidance application may determine the next display start time interval, wherein the start times are discretized (e.g., a display start time is in increments of five minutes or other interval).

Step 606 includes the guidance application determining a plurality of segments arranged according to a playback order and defined in metadata by a segment start time and a segment end time. In some embodiments, the guidance application retrieves metadata that includes the playback order, and segment time information. In some embodiments, segment identifiers (e.g., indices, names, or other identifiers) are used to refer to segments during processing. The playback order need not be included explicitly, as the segments may be identified by their playback index, and no additional playback order is needed.

Step 608 includes the guidance application determining a display end time, wherein the display start time and the display end time define a playback time interval. In some embodiments, the guidance application selects the normally scheduled display end time as the display end time. In some embodiments, a user may specify one or more events in a guidance application, a calendar application accessible by the guidance application, or other suitable application, and the guidance application may select the event time as the display end time. For example, the display end time may coincide with a pre-planned activity, a different program viewing, a software alarm, a suitable calendar item, or any other suitable event. The display end time may be before, after, or coincide with the normally scheduled display end time, in accordance with some embodiments of the present disclosure.

Step 610 includes the guidance application selecting a set of segments based on the profile information, wherein the set of segments have a cumulative playback time less than or equal to the playback time interval. In some embodiments, the guidance application assigns each segment a score based on the user profile information, metadata, any other suitable information, or any combination thereof. The description of process 700 of FIG. 7 includes further description of selecting the set of segments based on available or determined information. In some embodiments, the guidance application selects segment identifiers that satisfy one or more criteria, and then proceeds to step 612.

Step 612 includes the guidance application generating for display a condensed version of the content item, according to the playback order including the set of segments of the content item. In some embodiments, the guidance application causes transmission of video data to a display device (e.g., display 512) to generate the display on the display device (e.g., display 512). For example, control circuitry may transmit a high-definition multimedia interface (HDMI) signal to the display device, over a suitable cable or connection, to generate a grid including the program identifiers (e.g., similar to display 100 of FIG. 1). In some embodiments, the guidance application adds auxiliary content such as advertisements, credits, or other content to the selected set of segments, taking into account the available real time interval all content must fit within.

Figure 7:
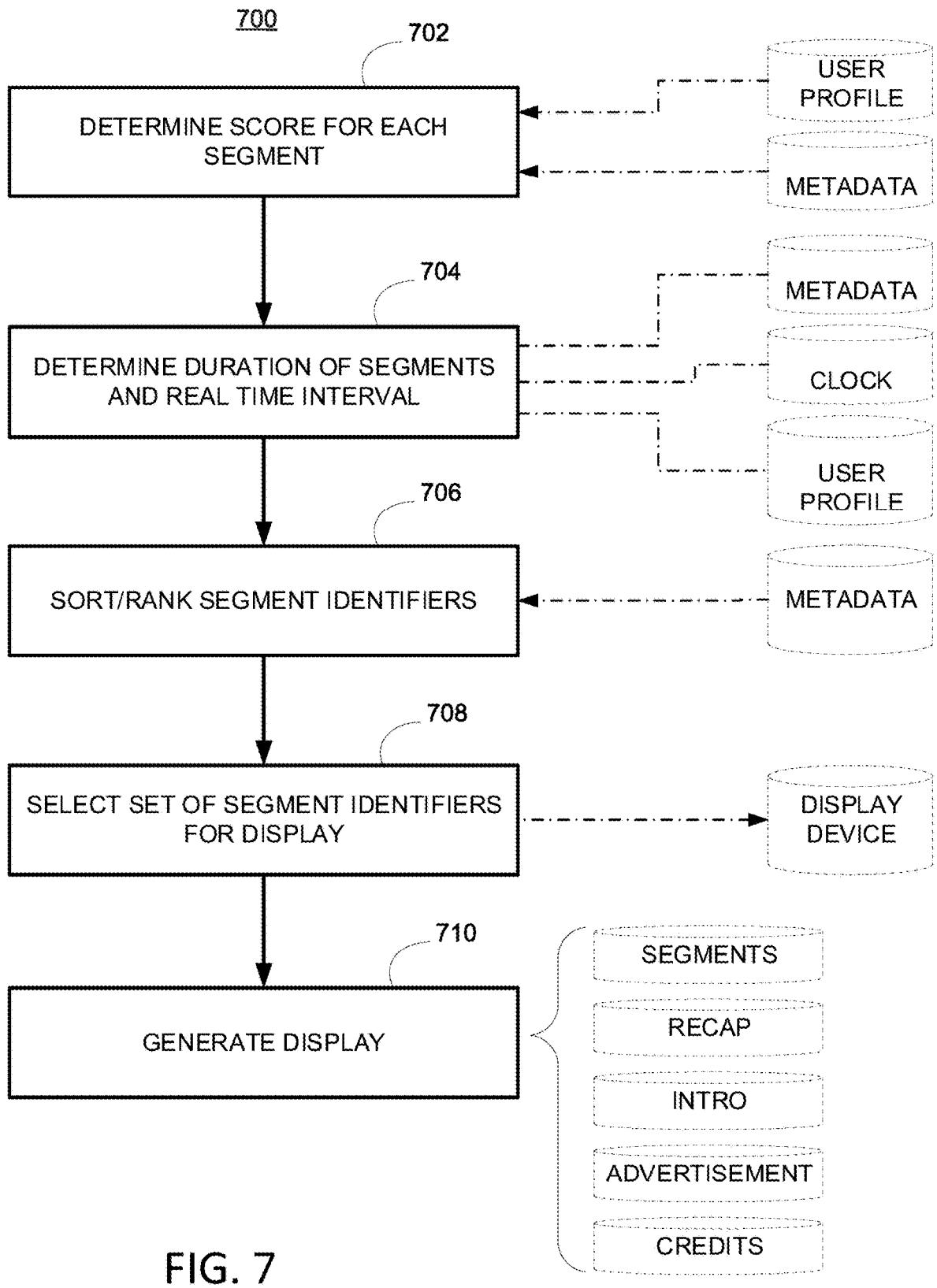
FIG. 7 is a flowchart of an illustrative process for selecting segments for display under time constraints, in accordance with some embodiments of the present disclosure.

FIG. 7 is a flowchart of illustrative process 700 for selecting segments for display under time constraints, in accordance with some embodiments of the present disclosure. The illustrative steps of process 700 may be performed by a guidance application implemented on, for example, user device 500 of FIG. 5, user equipment system 501 of FIG. 5, a network entity (e.g., a server) communicatively coupled to user device 500, user equipment system 501, or a display device, any other suitable computing device, or any combination thereof.

Step 702 includes a guidance application determining a score for each segment of a plurality of segments of media content. In some embodiments, the guidance application retrieves a score for each segment stored in metadata (e.g., a pre-computed score). For example, an importance score for each segment may be stored in the metadata, allowing segments to be compared and/or ranked by importance. In some embodiments, the guidance application determines a score for each segment based on information stored in metadata. For example, the metadata may include popularity information, storyline information, segment identifiers, playback order, any other suitable information, or any combination thereof that the guidance application may use to sort or rank the segments. In some embodiments, the guidance application determines a score for each segment based on user profile information and the metadata. For example, the guidance application may retrieve information such as keyword tags for each segment and may also retrieve user profile information such as keywords corresponding to viewing preferences. By comparing the metadata tags to user preferences, the guidance application may determine a relevancy of each segment to the user and accordingly assign a higher score to more relevant segments. In some embodiments, the guidance application determines the score based on a weighted consideration of user preferences, segment metadata, segment duration, segment attributes, segment index, any other suitable information, or any combination thereof.

In some embodiments, at step 702, the guidance application determines a relatively higher score for a first segment, a last segment, or both. In some embodiments, at step 702, the guidance application determines a relatively higher score for shorter segments (e.g., more shorter segments may be included in a real time interval) or longer segments (e.g., longer segments may include more important plot arcs). In some embodiments, the guidance application may determine one or more favorite characters, actors, locations, or other attributes from the user's profile, and determine a relatively higher score for segments having keyword tags in metadata that match the favorite attributes. In some embodiments, the guidance application may determine one or more tags created by the user and stored in the user's profile, and determine a relatively higher score for segments having keyword tags in metadata that match the one or more tags. Table 1 shows some metrics that may be used in determining segments' scores. For example, one or more illustrative metrics of Table 1 may be assigned a number value, and a score may be determined as an average of the values, a weighted average of the values, a sum of the values, a product of values, a subset of values, any other suitable composite value based on the values, or any combination thereof.

TABLE 1

Illustrative metrics for scoring segments.

| Metric Name | Based on, e.g.: |
| --- | --- |
| Popularity | Views, Likes, Rating, Ranking, Survey |
| Duration | Metadata, User Profile Information |
| Index | Metadata, User Profile Information |
| Attributes | Metadata, User Profile information |
| Importance | Metadata, User Profile Information |

In an illustrative example, a popularity metric, as included in Table 1, may be determined based on a number of views of a segment, a number of "likes" of a segment (e.g., from a social media application), a rating of a segment, a ranking of a segment relative to other segments, a survey result or a statistical result from a plurality of users' input, any other suitable information related to a segment's popularity, or any combination thereof. The guidance application may receive information from one or more applications (e.g., social media applications, survey applications, user-tracking applications), one or more databases (e.g., a media guidance database including view, rating, or ranking information), or a combination thereof.

In an illustrative example, a duration metric, as included in Table 1, may be determined based on the playback length of a segment as determined from metadata, duration preferences, any other suitable information related to a playback length of a segment, or any combination thereof. The guidance application may retrieve metadata, which may include temporal information from which a segment's duration may be determined. The guidance application may also determine one or more criteria for determining the duration metric. For example, the user profile information may include the user's preferences towards relatively short or long segments. In a further example, the criteria may include a minimum duration, a maximum duration, or both (e.g., a range) for use in generating the metric. In some embodiments, segments having a duration shorter than a threshold may be assigned a metric value that is either less than or greater than that assigned to a segment having a duration longer than the threshold. In some embodiments, the duration metric may be proportional to, inverse to, or otherwise functionally dependent on the segment's duration.

In an illustrative example, an index metric, as included in Table 1, may be determined based on the playback index of a segment as determined from metadata, index preferences, any other suitable information related to a playback index of a segment, or any combination thereof. The playback index is the sequence position of the segment (e.g., an index of "3" is the third segment in playback order). The guidance application may retrieve metadata, which may include temporal information, index information, or both, from which a segment's index may be determined. The guidance application may also determine one or more criteria for determining the index metric. For example, the user profile information may include the user's preferences towards relatively early or late segments. In a further example, the criteria may include a metadata tag for a program indicating that the last segment is always important. In some embodiments, segments having an index less than a threshold may be assigned a metric value that is either less than or greater than that assigned to a segment having an index later than the threshold. In some embodiments, the index metric may be proportional to, inverse to, or otherwise functionally dependent on the segment's index.

In an illustrative example, an attributes metric, as included in Table 1, may be determined based on attributes of a segment as determined from metadata, user profile information, any other suitable information related to attributes of a segment, or any combination thereof. Attributes include, for example, characters, locations, plot arcs, genre type, scenes, entities or organizations, any other aspects depicted in a segment, or any combination thereof. Attributes may also include non-depicted information such as, for example, actors, actresses, directors, or other real-world entities associated with a segment. The guidance application may retrieve metadata, which may include attribute information (e.g., tags), from which a segment's attributes may be determined. The guidance application may also determine one or more criteria for determining the attribute metric. For example, the user profile information may include the user's preferences towards attributes (e.g., favorite attributes, least favorite attributes, most-watched attributes). In a further example, the criteria may include a metadata tag for a program indicating that one or more attributes are always important (e.g., a main character or central location). In some embodiments, segments having fewer attributes than a threshold may be assigned a metric value that is less than that assigned to a segment having more attributes than the threshold. In some embodiments, the attribute metric may be proportional to, or otherwise functionally dependent on the segment's number of associated attributes. In some embodiments, the attributes metric includes an average, weighted average, or other composite value based on sub-metric values for each attribute of a segment (e.g., each attribute has an associated sub-metric value, which collectively are used to determine the attributes metric).

In an illustrative example, an importance metric, as included in Table 1, may be determined based on the relative importance of a segment relative to other segments, any other suitable information related to importance of a segment, or any combination thereof. In some embodiments, importance is determined based on metadata tags that include an importance ranking (e.g., as determined by the content's creator, or broadcast channel), users' feedback on the segment's importance (e.g., via a survey or other conduit for user input), or any other information. Attributes may also be used to determine how important a segment is (e.g., segments having more associated attributes may be more important). The guidance application may retrieve metadata, which may include tags, from which a segment's importance may be determined. The guidance application may also determine one or more criteria for determining the importance metric. For example, the user profile information may include the user's preferences towards a particular plot arc/character/location or other attribute, and the guidance application may assign a relatively higher importance metric to segments associated with the attributes. In some embodiments, an importance metric may be used to weigh other metrics. For example, the importance metric may include metric values (i.e., weightings) for each of the other metrics, such that their relative importance can be weighed, and a score may be determined based on a weighted combination (e.g., a weighted sum). In some embodiments, for example, the program's genre or other aspects may be used to determine an importance metric. For example, for a comedy, the user profile information may indicate that the user may appreciate comedic segments, and in which case the "must watch" (i.e., important) segments will total to 50 minutes (e.g., most of the program is comedic). Alternatively, for a drama, the user may appreciate only a few segments and hence the important segments may total to only 25 minutes. Accordingly, the guidance application may use the importance metric as a score by itself, and accordingly generate condensed content based on the user profile information.

Step 704 includes the guidance application determining a duration for each segment of the plurality of segments and a real time interval over which condensed content is to be displayed. In some embodiments, the metadata includes time indicators such as segment start time, segment end time, segment duration, cumulative content duration (e.g., at the end of each segment), or a combination thereof. The guidance application may determine the duration directly (e.g., retrieving the duration directly from metadata), determine the duration based on the start time and end time for the segment (e.g., by taking difference), determine the duration based on a start time of a segment and a start time of a subsequent segment (e.g., by taking a difference), determine the duration based on segment index (e.g., when all segments are the same duration, and that duration is determinable), or otherwise determine the duration of each segment based on time indicators or playback order information.

Step 706 includes the guidance application sorting, ranking, or both, the segment identifiers based at least in part on the score determined at step 702. In some embodiments, step 706 may be included with step 702 as a single process step. In some embodiments, the guidance application sorts the segment identifiers (e.g., segment index, title, or any other suitable identifier) in either ascending order or descending order. In some embodiments, step 706 need not be performed, as the score is used to provide the rankings, and no rearrangement is needed.

Step 708 includes the guidance application selecting a set of segment identifiers of the plurality of segment identifiers for display. In some embodiments, the guidance application selects segment identifiers associated with segments having a score greater than a threshold and a cumulative duration that fits within the real time interval. In some embodiments, for example, the guidance application selects the segments having the highest score, starting from the highest score down to a segment that causes the cumulative duration to be equal or less than the real time interval. For example, Table 2 shows a sequence of sorted segment identifier.

TABLE 2

Illustrative segment identifiers with scores.

| Sort Index | Score | Segment Identifier | Duration |
|---|---|---|---|
| 1 | 10 | Segment 3 | 10:00 |
| 2 | 9.1 | Segment 4 | 7:00 |
| 3 | 7 | Segment 8 | 7:00 |
| 4 | 6 | Segment 7 | 6:00 |
| 5 | 5.2 | Segment 1 | 8:00 |
| 6 | 5.1 | Segment 6 | 10:00 |
| 7 | 5.0 | Segment 2 | 5:00 |
| 8 | 1 | Segment 5 | 7:00 |

The "sort index" of Table 2 is the index of the segment identifiers sorted by score (e.g., highest score is "1" and the lowest score is "8" out of eight segments). The "segment identifiers" shown in Table 2 are the segments' respective playback indices (e.g., "Segment 2" is the second segment in the original playback order). The segment identifiers in Table 2 are sorted by score in descending order for illustration. Segments 1-8 correspond to an hour-long program, and the durations sum to sixty minutes. If the user selects this program twelve minutes into the normally scheduled display time, leaving forty-eight minutes of real time interval, the guidance application may select sort indices 1-6 (i.e., Segment Identifiers 3, 4, 8, 7, 1, and 6, in the illustrated example), as they have the highest scores and have cumulative duration of forty-eight minutes. In other words, if the program is scheduled to be displayed from 7:00 pm to 8:00 pm commercial free, and the user selects the program at 7:12 pm, the guidance application generates condensed content that includes a playback order of Segments 1, 3, 4, 6, 7, and 8, having a playback duration of forty-eight minutes.

Step 710 includes the guidance application generating a display (e.g., for display device 512) based on the selected set of segments of step 708. In some embodiments, the guidance application generates for display condensed content within time constrains. In some embodiments, the guidance application transitions from displaying a guide or content to displaying condensed content using any suitable technique. For example, the guidance application may rearrange displayed features, remove displayed features, add displayed features, zoom in or out of portions of the first display, or otherwise provide a transition from a displayed guide or content to the display of condensed content. In a further example, the guidance application may remove information that no longer corresponds to the condensed content (e.g., modify a content summary or duration displayed in a media guide). In some embodiments, control circuitry transmits video data to the display device (e.g., display 512) to generate the display on the display device (e.g., display 512). For example, the control circuitry may transmit a high-definition multimedia interface (HDMI) signal to the display device, over a suitable cable or connection, to generate a grid including the program identifiers (e.g., similar to display 100 of FIG. 1).

Figure 8:
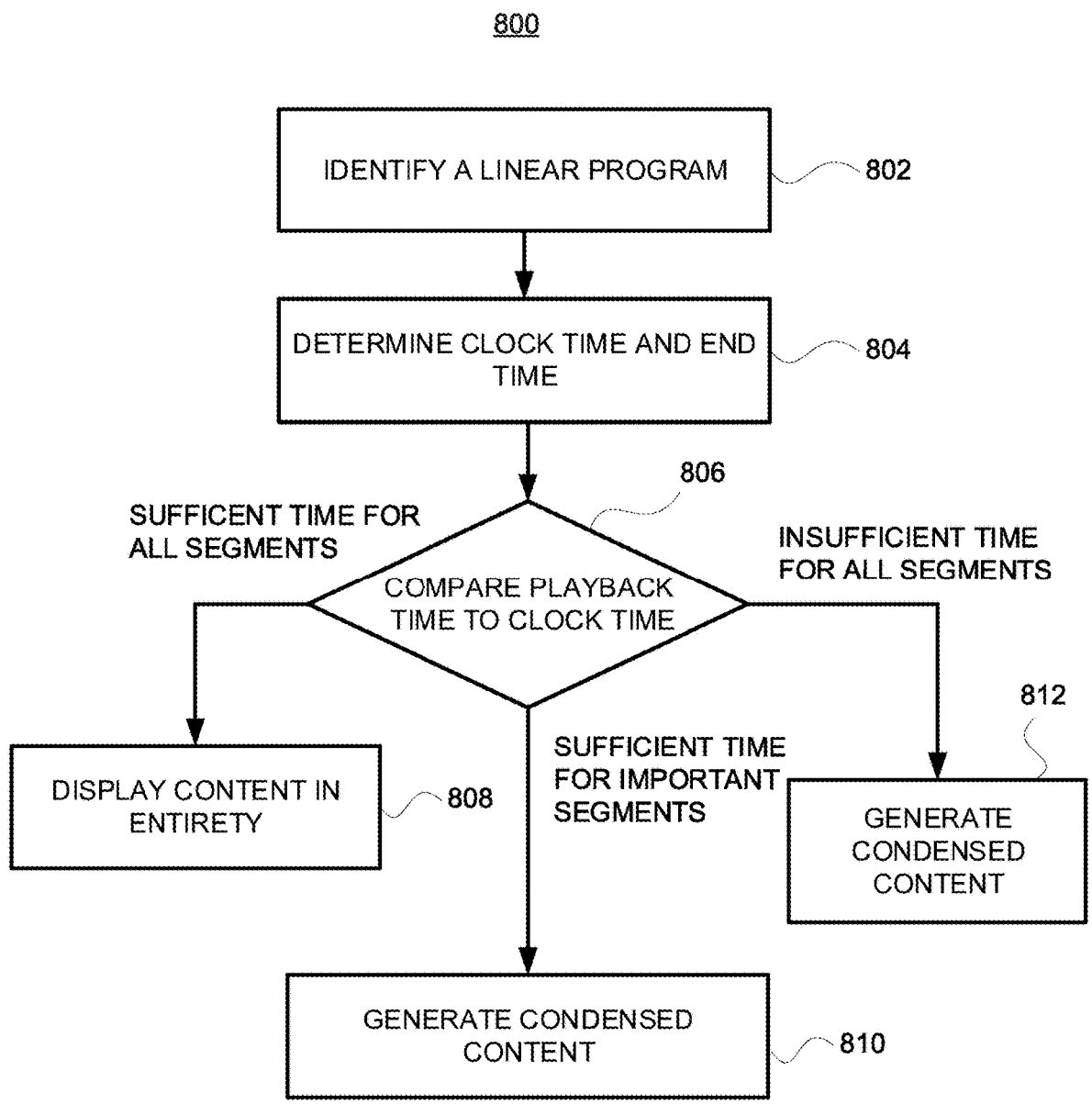
FIG. 8 is a flowchart of an illustrative process for selecting segments for display under time constraints based on viewing behavior, in accordance with some embodiments of the present disclosure.

FIG. 8 is a flowchart of illustrative process 800 for selecting segments for display under time constraints based on viewing behavior, in accordance with some embodiments of the present disclosure. The illustrative steps of process 800 may be performed by a guidance application implemented on, for example, user device 500 of FIG. 5, user equipment system 501 of FIG. 5, a network entity (e.g., a server) communicatively coupled to user device 500, user equipment system 501, or a display device, any other suitable computing device, or any combination thereof.

Step 802 includes the guidance application identifying a program. In some embodiments, the guidance application identifies the program based on which program is currently highlighted by a displayed cursor of a guidance application. In some embodiments, the guidance application identifies the program based on user input. In some embodiments, the guidance application identifies the program based on which program is currently being displayed, was previously displayed, is scheduled to be displayed currently, or is otherwise highlighted relative to other programs. In some embodiments, the guidance application identifies the program as one program of a plurality of programs, and process 800 is performed for each program. In some embodiments, the guidance application is configured to receive user input to a user interface (e.g., user input interface 510). The user input may include, for example, haptic input to a touchscreen, depression of buttons of a keypad, voice input to an audio interface (e.g., audio equipment 514), any other input by a user to the system, or any combination thereof. For example, a user may use directional keys on a keypad of a remote-control device configured to communicate with equipment device 500. In a further example, a user may provide a haptic selection on a touchscreen of user device 500. In some embodiments, the system is configured to wait for user input, or otherwise not proceed from step 802 until user input is received.

In some embodiments, at step 802, the guidance application receives a user selection of a program and, in response to the selection, retrieves metadata for the program. For example, a user may select a displayed program identifier in a guidance application, and the guidance application may then retrieve information about the program. In some embodiments, step 802 includes the guidance application retrieving information corresponding to the program. In some embodiments, the guidance application retrieves the information for the program in response to identifying the program. For example, the system may retrieve metadata and user profile information from local memory (e.g., a local hard disk drive, solid state hard drive, or storage 508), a database (e.g., local or remote), a network device (e.g., a server, cloud-based computing device, or central computing device), any other suitable data source, or any combination thereof. In some embodiments, for example referencing FIG. 3, the guidance application may retrieve information 310 in response to identifying the program. In a further example, the guidance application may retrieve information 310 for the program and construct, and store in memory (e.g., storage 508), condensed content 350 for one or more time intervals based on information 310. In a further example, the guidance application may retrieve (e.g., from storage 508) information 310 and generate timeline 371, or any other suitable timeline-like data object (e.g., a playback order), and store timeline 371 in memory (e.g., storage 508), in preparation for generating a display. In some embodiments, metadata corresponding to segments of the video content of the program may be generated using artificial intelligence (AI) processes, configured to tag content as it is produced. In some embodiments, metadata may be generated during or shortly after content generation (e.g., preprocessing recordings or episodes), at content display time (e.g., before, during, or after), at content recording, or a combination thereof.

Step 804 includes the guidance application determining a clock time and an end time, thus defining a real time interval. Control circuitry may include an oscillator circuit (e.g., an RTC), for example, that may be referenced to a time standard (e.g., a software clock that is updated based on a network entity). The end time may coincide with a scheduled end time of a program, an event inputted by a user, or other temporal point indicating the end of the available viewing window. For example, in some embodiments, the guidance application stores the clock time that it receives the user selection from step 802, and then determines the regularly scheduled end time of the program. The real time interval is the span of time between the clock time of step 802 and the end time. In some embodiments, the guidance application rounds the real time interval to a predetermined temporal resolution (e.g., rounds down to ensure the condensed content fits in the interval). For example, the guidance application may determine real time intervals in increments of five minutes. To illustrate, if at 8:14 pm a user selects a program scheduled to be displayed between 8:00 pm and 9:00 pm, the real time interval may be determined to be forty-six minutes (e.g., difference), forty-five minutes (e.g., rounded to five-minute intervals), forty minutes (e.g., rounded to ten-minute intervals), or any other suitable interval.

Step 806 includes the guidance application comparing playback time to clock time. In some embodiments, step 806 includes the guidance application evaluating segments of the program to determine a subset of segments having a playback time that fits within the real time interval from the clock time to the end time determined at step 804. Some results of step 806 are illustrated in FIG. 8, in connection with steps 808, 810, and 812. For example, the playback time and the real time interval may be approximately equal, or one may be greater than the other. The guidance application responds differently to these circumstances. In some embodiments, the guidance application determines a difference between the playback time of one or more segments and the real time interval. In some embodiments, the guidance application determines a content start time be subtracting the playback time from the end time, and then compares the content start time to the clock time.

Step 808 includes the guidance application causing the content to be displayed without condensing. For example, if the real time interval can accommodate all segments of the program, or nearly accommodate all segments of the program, then the guidance application does not generate condensed content. For example, if a user selection occurs at 8:04 pm of a program scheduled for 8:00 pm-9:00 pm, the guidance application may determine that the real time interval is sufficient to display all segments. This may be especially useful when segments are longer than the difference between the real time interval and the regularly scheduled duration of the program. To illustrate, condensing an hour-long program to fifty-six minutes might not be preferred in some circumstances. In a further example, if the user selection occurs at 8:04 of a program scheduled for 8:00 pm-9:00 pm, the guidance application may cause the program to be displayed as scheduled and the user misses four minutes of content.

Step 810 includes the guidance application causing condensed content to be displayed, including all segments predetermined as being important. For example, if the real time interval cannot accommodate all segments of the program, but can accommodate the subset of segments predetermined to be important, the guidance application may display the condensed content based on a determined playback order. For example, if a user selection occurs at 8:24 pm of a program scheduled for 8:00 pm-9:00 pm, and the cumulative duration of the important segments is thirty-two minutes, the guidance application may determine that the real time interval (e.g., thirty-six minutes in this example) is sufficient to display all important segments. This may be especially useful when the guidance application predetermines one or more versions of condensed content that include important segments. To illustrate, the guidance application may pre-generate one or more versions of condensed content having progressively shorter durations, and then, based on the real time interval available for display, select the version of condensed content that best fits within the real time interval. In some embodiments, the guidance application may determine that while a condensed version does not fit exactly within the real time interval, it is close enough that no further condensing is required, and some of the condensed version need not be displayed. For example, if the user selection occurs at 8:24 of a program scheduled for 8:00 pm-9:00 pm, and the shortest condensed version of content of thirty-eight minutes long, the guidance application may cause the condensed content to be displayed, minus the first two minutes so that the condensed content fits within thirty-six minutes. In a further example, if the user selection occurs at 8:24 of a program scheduled for 8:00 pm-9:00 pm, and the shortest condensed version of content of thirty-eight minutes long, the guidance application may cause the condensed content to be displayed, minus the first two minutes of the least important segment so that the condensed content fits within thirty-six minutes.

Step 812 includes the guidance application causing condensed content to be displayed based on the available real time interval and user profile information. For example, if the real time interval cannot accommodate all segments of the program, nor a subset of segments predetermined to be important, the guidance application may generate condensed content that fits within the real time interval. For example, if a user selection occurs at 8:24 pm of a program scheduled for 8:00 pm-9:00 pm, the guidance application may determine that the real time interval is thirty-six minutes. In some embodiments, the guidance application may pre-generate one or more versions of condensed content having progressively shorter durations, and then, based on the real time interval available for display, select the version of condensed content that best fits within the real time interval. In some embodiments, the guidance application may determine that while a condensed version does not fit exactly within the real time interval, it is close enough that no further condensing is required, and some of the condensed version need not be displayed. In some embodiments, the guidance application selects a subset of segments based on user profile information, for which the cumulative playback time fits within the real time interval.

In an illustrative example, consider a user that is interested in program "NCIS" which is scheduled from 8 pm to 9 pm. The current time is 8:14 pm (e.g., similar to that illustrated in FIG. 1). Since user has missed some of at least one initial segment, the guidance application must determine how to generate the content for display. The guidance application may select among a plurality of viewing options in some such circumstances. In some embodiments, the guidance application may determine that the user can catch up on the program in its entirety from beginning. For example, the guidance application may generate the full content (i.e., all segments), and determine a display start time of 8:14 pm (e.g. the user can watch without missing any segments, but the program will end at 9:14 pm instead of 9:00 pm). In some embodiments, the guidance application may provide for a fast catchup of any missed segments and then watch remaining segments live. For example, the program still has a display end time of 9 pm, but the faster catchup of initial missed segments means missed segments are displayed only partially or sped-up in payback speed, which may lead to a sub-optimal user experience. In some embodiments, the guidance application generates a condensed version of the program to fit within the remaining real time interval ending at the normally scheduled end time. In some embodiments, the guidance application identifies a time marker associated with a condensed version of the content and generates the condensed content for display at the time indicated by the marker, or at the current time (e.g., although the condensed version may end before the normally scheduled end time).

Figure 9:
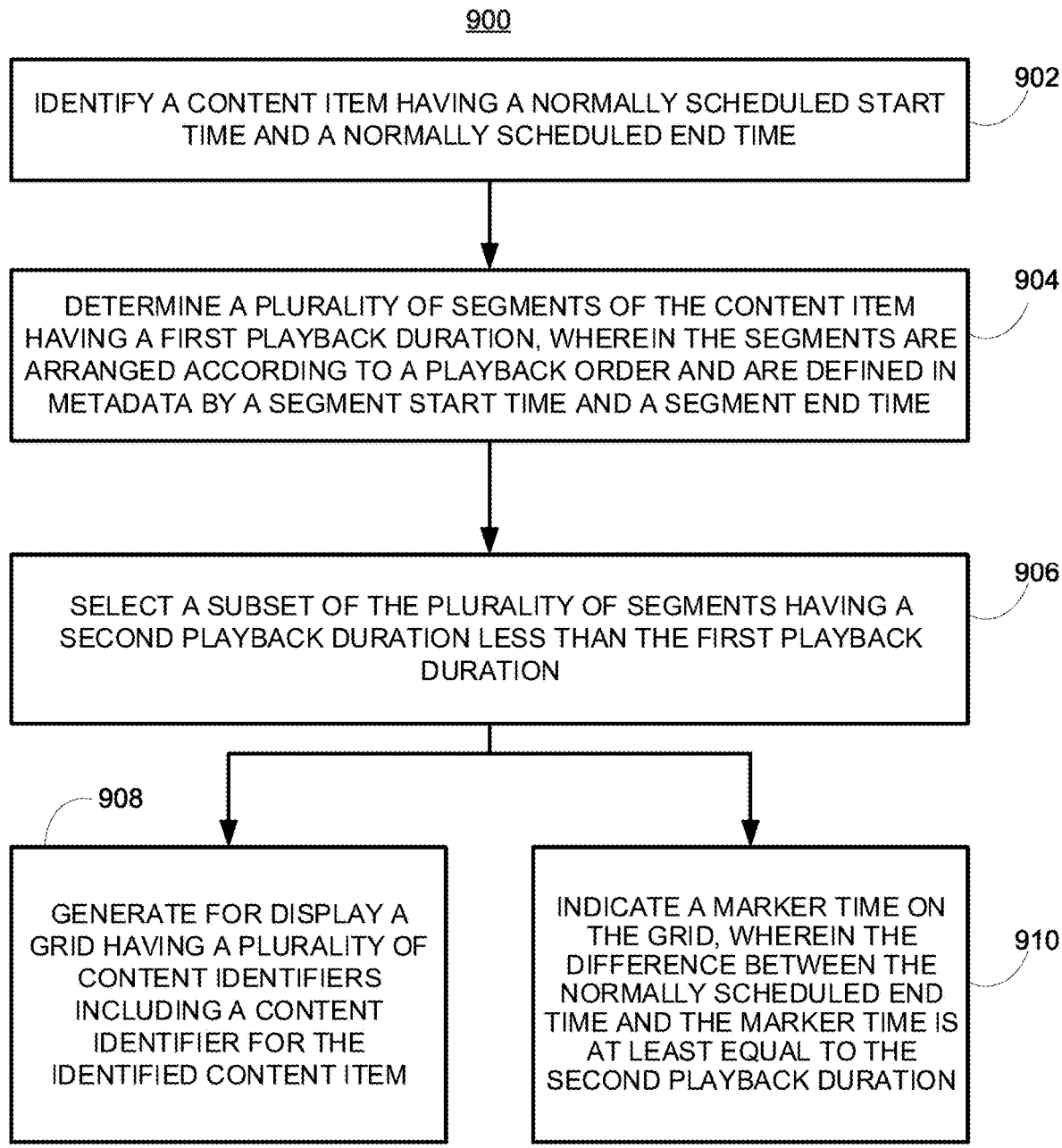
FIG. 9 is a flowchart of an illustrative process for generating a marker indicative of condensed content, in accordance with some embodiments of the present disclosure.

FIG. 9 is a flowchart of illustrative process 900 for generating a marker indicative of condensed content, in accordance with some embodiments of the present disclosure. The illustrative steps of process 900 may be performed by a guidance application implemented on, for example, user device 500 of FIG. 5, user equipment system 501 of FIG. 5, a network entity (e.g., a server) that optionally may be communicatively coupled to user device 500, user equipment system 501, or a display device, any other suitable computing device, or any combination thereof.

Step 902 includes the guidance application identifying a content item, such as a program, having a normally scheduled start time and a normally scheduled end time. In some embodiments, the guidance application identifies the content item from among a plurality of content items. For example, the illustrative steps of process 900 may be performed for each content item of the plurality of content items. In some embodiments, step 902 includes the guidance application retrieving information corresponding to the content item. In some embodiments, the guidance application retrieves the information for the content time in response to identifying the content item. For example, the system may retrieve metadata and user profile information from local memory (e.g., a local hard disk drive, solid state hard drive, or storage 508), a database (e.g., local or remote), a network device (e.g., a server, cloud-based computing device, or central computing device), any other suitable data source, or any combination thereof. In some embodiments, for example referencing FIG. 3, the guidance application may retrieve information 310 in response to identifying the content item. The guidance application need not perform step 902 in response to a user selection, a currently displayed content item, or any other viewing-based stimulus. For example, the guidance application may identify a content item based on a list of content items, a scheduled performance of step 902, in response to a request (e.g., from a host application, user device, or other application or device), or at any other suitable time.

Step 904 includes the guidance application determining a plurality of segments of the content item, which have a first playback time. The segments are arranged according to a playback order, and each segment is defined in metadata by a segment start time and a segment end time. In some embodiments, the guidance application retrieves metadata that includes the playback order and segment time information. In some embodiments, segment identifiers (e.g., indices, names, or other identifiers) are used to refer to segments during processing (e.g., process 900). The playback order need not be included explicitly, as the segments may be identified by their playback index, and no additional playback order is needed.

Step 906 includes the guidance application selecting a set of segments of the plurality of segments. In some embodiments, the guidance application selects the set of segments based on profile information (e.g., of a typical user, general viewer statistics, or a particular user). The set of segments have a second playback time that is less than the first playback time. In some embodiments, the guidance application assigns each segment a score based on the user profile information, metadata, any other suitable information, or any combination thereof. The description of process 700 of FIG. 7 includes further description of selecting the set of segments based on available or determined information. In some embodiments, the guidance application selects segment identifiers that satisfy one or more criteria, and then proceeds to step 908.

Step 908 includes the guidance application generating a grid for display. The grid includes a plurality of content identifiers including a content identifier for the content item identified at step 902. In some embodiments, the guidance application causes the control circuitry to transmit video data to a display device (e.g., display 512) to generate a display on the display device (e.g., display 512). The display may include episode identifiers, time indicators, ratings, content descriptions, any other suitable information, any other suitable features, or any combination thereof. For example, the control circuitry may transmit a high-definition multimedia interface (HDMI) signal to the display device, over a suitable cable or connection, to generate a grid including the episode identifiers (e.g., similar to the displays of FIGS. 1-2). The grid may include two primary axes, which are normal to each other. Arranged along one axis are a plurality of channels or content providers. Arranged along the other axis are a plurality of time indicators, such that content items for each channel or content provider are arranged in an order of scheduled display time. The grid includes a plurality of content identifiers, each corresponding to a respective content item. For example, displays 100 and 150 of FIG. 1, and display 200 of FIG. 2, illustrate content identifiers arranged in a grid having two axes.

Step 910 includes the guidance application indicating a marker time on the grid, wherein the difference between the normally scheduled end time and the marker time is at least equal to the second playback duration. In some embodiments, the guidance application stores marker information indicative of the marker time as part of the metadata. For example, the marker information may include one or more time tags (e.g., as shown by information 310 of FIG. 3). In a further example, marker information may include a start time at which there is sufficient time to display the set of segments of step 906. To illustrate, the marker indicates a start time of the available time interval, wherein the playback time of the set of segments (e.g., the condensed content) extends from the start time to the normally scheduled end time of the content item (e.g., as illustrated by marker 101 of display 100 of FIG. 1). In some embodiments, the guidance application generates a marker on a displayed grid to provide a visual indication of the marker time. For example, the marker time may include a time when the content item must begin being displayed by to accommodate the playback time of the set of segments. The marker may include any suitable shape, size, color, rendering, icons, text, images, or other visual attributes, which may be overlaid on a grid, arranged relative to the grid, incorporated into a displayed content identifier, or otherwise included in a display of content identifiers.

In an illustrative example, the guidance application may repeat process 900 for each content item of a plurality of content items to generate for display a plurality of markers, each of the plurality of markers corresponding to a respective content item. Display 200 of FIG. 2 shows a displayed grid and a plurality of markers (e.g., each generated using process 900). In some embodiments, the guidance application selects more than one set of segments of the plurality of segments based on profile information, having respective playback times. The guidance application may then generate for display more than one marker on the grid indicating a respective marker time for each playback duration. For example, each content identifier may have one or more associated markers. As illustrated by display 200 of FIG. 2, "America's Got Talent" has two associated markers, corresponding to two sets of segments having different cumulative playback lengths and thus different marker times. Accordingly, metadata associated with a content item may include marker information for one or more markers, that correspond to respective sets of segments of the content item (e.g., respective versions of condensed content).

In an illustrative example, the illustrative steps of process 900 need not be performed at the same time, within the same application, or on the same device. For example, a network entity may perform steps 902, 904, 906, and 910, thus storing marker information in metadata associated with the content item. The network entity may perform these steps prior to a display of content identifiers. For example, the marker information may be stored in metadata minutes, days, or even weeks (or longer) before the content item is scheduled for display. When a content identifier corresponding to the content item is displayed in a grid (e.g., step 908) at a later time, for example, a guidance application may further perform step 908 to generate a marker for display with the grid based on the stored marker information. Step 908 may include storing marker information, generating a marker for display, or both.

For any suitable of steps of processes 600, 700, 800, and 900, control circuitry of the system transmits video data to the display device (e.g., display 512) to generate the display on the display device (e.g., display 512). The display may include episode identifiers, time indicators, any other suitable features, or any combination thereof. For example, the control circuitry may transmit a high-definition multimedia interface (HDMI) signal to the display device (e.g., display 512), over a suitable cable or connection, to generate a grid including the program identifiers (e.g., similar to display 100 of FIG. 1).

It is contemplated that the steps or descriptions of FIGS. 6-9 may be used with any other embodiment of this disclosure. In addition, the steps and descriptions described in relation to FIGS. 6-9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the respective processes. Furthermore, it should be noted that any of the devices or equipment discussed in relation to FIGS. 5, a suitable network entity (e.g., a server), or a combination thereof, could be used to perform one or more of the steps in FIGS. 6-9. Furthermore, it should be noted that the features and limitations described in any one embodiment may be applied to any other embodiment herein, and flowcharts or examples relating to one embodiment may be combined with any other embodiment in a suitable manner, done in different orders, performed with addition steps, performed with omitted steps, or done in parallel. For example, each of these steps may be performed in any order or in parallel or substantially simultaneously to reduce lag or increase the speed of the system or method. In addition, the systems and methods described herein may be performed in real time. It should also be noted that the systems and/or methods described above may be applied to, or used in accordance with, other systems and/or methods.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:
1. A method comprising:
    displaying a content schedule comprising a plurality of identifiers on a display;
    displaying a first identifier of the plurality of identifiers, wherein the first identifier corresponds to a first option to play a full version of a first content item;

displaying a first end time of the full version of the first content item;
receiving an inputted end time via a user interface;
generating a reduced version of the first content item, based at least in part on receiving the inputted end time;
displaying a second identifier of the plurality of identifiers, wherein the second identifier corresponds to a second option to play the reduced version of the first content item;
displaying a marker indicating a second end time of the reduced version of the first content item, wherein:
the second end time corresponds to the inputted end time;
the second end time is different than the first end time; and
the first identifier, the second identifier, the first end time, and the second end time are all displayed at the same time; and
displaying the reduced version of the first content item, based at least in part on a selection of the second identifier.

2. The method of claim 1, wherein the first content item comprises a plurality of segments, and the reduced version of the first content item comprises a subset of the plurality of segments of the first content item.

3. The method of claim 2, wherein the reduced version of the first content item is generated by selecting the subset of the plurality of segments based on profile information.

4. The method of claim 3, wherein:
the profile information comprises preferred attributes;
the first content item comprises metadata that comprises segment attributes for each segment of the plurality of segments of the first content item; and
selecting the subset of the plurality of segments comprises comparing the segment attributes to the preferred attributes.

5. The method of claim 2, wherein the reduced version of the first content item is generated by:
determining a playback score for each segment of the plurality of segments of the first content item based on profile information; and
selecting the subset of the plurality of segments of the first content item using the playback scores.

6. The method of claim 5, wherein the determining the playback score for each segment of the first content item comprises determining the playback scores based at least in part on metadata associated with the first content item.

7. The method of claim 1, further comprising generating a reduced version of a second content item, based at least in part on receiving the inputted end time.

8. The method of claim 7, further comprising:
displaying a third identifier of the plurality of identifiers, wherein the third identifier corresponds to a third option to play a full version of the second content item;
displaying a third end time of the full version of a second content item;
displaying a fourth identifier of the plurality of identifiers, wherein the fourth identifier corresponds to a fourth option to play the reduced version of the second content item; and
displaying a fourth end time of the reduced version of the second content item, wherein the fourth end time corresponds to the inputted end time.

9. A system for displaying condensed content, the system comprising:
a display device;
memory configured to store metadata; and
control circuitry coupled to the display device and coupled to the memory, and configured to:
display a content schedule comprising a plurality of identifiers on the display device;
display a first identifier of the plurality of identifiers, wherein the first identifier corresponds to a first option to play a full version of a first content item;
display a first end time of the full version of the first content item;
receive an inputted end time via a user interface;
generate a reduced version of the first content item, based at least in part on receiving the inputted end time;
display a second identifier of the plurality of identifiers, wherein the second identifier corresponds to a second option to play the reduced version of the first content item;
display a marker indicating a second end time of the reduced version of the first content item, wherein:
the second end time corresponds to the inputted end time;
the second end time is different than the first end time; and
the first identifier, the second identifier, the first end time, and the second end time are all displayed at the same time; and
display the reduced version of the first content item, based at least in part on a selection of the second identifier.

10. The system of claim 9, wherein the first content item comprises a plurality of segments, and the reduced version of the first content item comprises a subset of the plurality of segments of the first content item.

11. The system of claim 10, wherein the control circuitry is further configured to generate the reduced version of the first content item by selecting the subset of the plurality of segments based on profile information.

12. The system of claim 11, wherein:
the profile information comprises preferred attributes;
the first content item comprises metadata that comprises segment attributes for each segment of the plurality of segments of the first content item; and
the control circuitry is further configured, when selecting the subset of the plurality of segments, to compare the segment attributes to the preferred attributes.

13. The system of claim 10, wherein the control circuitry is further configured, when generating the reduced version of the first content item, to:
determine a playback score for each segment of the plurality of segments of the first content item based on profile information; and
select the subset of the plurality of segments of the first content item using the playback scores.

14. The system of claim 13, wherein the control circuitry is further configured, when determining the playback score for each segment of the first content item, to determine the playback scores based at least in part on metadata associated with the first content item.

15. The method of claim 9, wherein the control circuitry is further configured to generate a reduced version of a second content item, based at least in part on receiving the inputted end time.

16. The method of claim 15, wherein the control circuitry is further configured to:
display a third identifier of the plurality of identifiers, wherein the third identifier corresponds to a third option to play a full version of the second content item;

display a third end time of the full version of a second content item;
display a fourth identifier of the plurality of identifiers, wherein the fourth identifier corresponds to a fourth option to play the reduced version of the second content item; and
display a fourth end time of the reduced version of the second content item, wherein the fourth end time corresponds to the inputted end time.

* * * * *

UNITED STATES PATENT AND TRADEMARK OFFICE
CERTIFICATE OF CORRECTION

| | | |
|---|---|---|
| PATENT NO. | : 12,137,268 B2 | Page 1 of 1 |
| APPLICATION NO. | : 18/084656 | |
| DATED | : November 5, 2024 | |
| INVENTOR(S) | : Vikram Makam Gupta et al. | |

It is certified that error appears in the above-identified patent and that said Letters Patent is hereby corrected as shown below:

On the Title Page

Item (71), Applicant:, change "Adeia Guides, Inc." to --Adeia Guides Inc.--

Signed and Sealed this
Thirty-first Day of December, 2024

Derrick Brent
*Acting Director of the United States Patent and Trademark Office*